United States Patent [19]

Erickson

[11] 4,353,331
[45] Oct. 12, 1982

[54] DUAL-EXPANSION INTERNAL COMBUSTION ENGINE UTILIZING AN OSCILLATING PISTON INSIDE AN OSCILLATING PISTON

[76] Inventor: Frederick L. Erickson, 2610 Bosworth Dr., Fort Wayne, Ind. 46805

[21] Appl. No.: 180,134

[22] Filed: Aug. 21, 1980

Related U.S. Application Data

[63] Continuation of Ser. No. 28,713, Apr. 9, 1979, abandoned, Continuation of Ser. No. 180,135, Aug. 21, 1980, Pat. No. 4,325,331, each is a continuation-in-part of Ser. No. 959,795, Nov. 13, 1978, abandoned.

[51] Int. Cl.³ ............................................. F02B 53/00
[52] U.S. Cl. ................................................ 123/18 R
[58] Field of Search ............... 123/18 R, 226; 91/339; 417/481; 418/160

[56] References Cited

FOREIGN PATENT DOCUMENTS

| 161083 | 6/1905 | Fed. Rep. of Germany .... 123/18 R |
|---|---|---|
| 2735725 | 2/1979 | Fed. Rep. of Germany .... 123/18 R |
| 2802123 | 7/1979 | Fed. Rep. of Germany .... 123/18 R |
| 2909715 | 9/1980 | Fed. Rep. of Germany .... 123/18 R |
| 305820 | 5/1955 | Switzerland ...................... 123/18 R |

Primary Examiner—Michael Koozo
Attorney, Agent, or Firm—Richard J. Hammond

[57] ABSTRACT

An internal combustion engine utilizes a first outer oscillating piston connected to the engine housing by means of a pivot bearing and a second inner piston connected to the first piston by means of a pivot bearing connection. The inner piston is rotatably connected through an eccentric shaft to a main power shaft. Rotation of the eccentric shaft causes the inner piston to oscillate relative to the outer piston and also causes the outer piston to oscillate relative to the engine housing. Each of the oscillating pistons defines two opposed chambers of complementary and variable volumes; and fluid porting means, responsive to the motions of the pistons, are provided to control the flow of fluid among the chambers to attain a dual expansion of the combustion gases. The result is an internal combustion engine which is efficient, quiet, cool running and less subject to wear than presently used engines.

22 Claims, 15 Drawing Figures

DUAL-EXPANSION INTERNAL COMBUSTION ENGINE UTILIZING AN OSCILLATING PISTON INSIDE AN OSCILLATING PISTON

This application is a continuation of my application Ser. No. 28,713 filed Apr. 9, 1979, now abandoned, which in turn was a continuation-in-part of my application Ser. No. 959,795, now abandoned, filed Nov. 13, 1978. This application is also a continuation of application Ser. No. 180,135, filed Aug. 21, 1980, now U.S. Pat. No. 4,325,331 which is also a continuation-in-part of Ser. No. 959,795 filed Nov. 13, 1978, now abandoned.

This invention relates to a novel internal combustion engine operating on a novel cycle. More particularly, this invention relates to an internal combustion engine which exhibits the performance characteristics of a four-stroke cycle engine while retaining the advantages of simplicity normally associated with the two-stroke cycle engine.

The standard two-stroke internal combustion piston engine is generally used to power hand-held tools such as chain saws and other devices where a relatively high power-to-weight ratio is desired. Such two-stroke engines are not fuel efficient; and they develop a relatively high level of noise and hydrocarbon pollution. Although mufflers may be used to lower the noise level of these engines, they add to their weight, thus merely substituting one cause of operator discomfort and fatigue for another.

Although the four-stroke internal combustion piston engines exhibit relatively high fuel efficiency, they are generally expensive to manufacture because of the necessity for complex valve mechanisms. Moreover, they are too heavy and bulky for those applications requiring a high power-to-weight ratio. Therefore, they are limited to such uses as power lawn mowers, snow blowers and the like. The four-stroke piston engines possess high vibration levels, especially in one and two-cylinder configurations. This disadvantage tends to make it uncomfortable for operators in close contact with the engines in operation. Although the exhaust noise level of the four-stroke engines is not as high or irritating as a two-stroke cycle engine, they still must incorporate adequate muffler means to reduce exhaust noises to acceptable levels.

Wankel engines inherently do not exhibit high fuel efficiencies, due in part to fuel mixture blowby occurring as the apex seal clearance gap opens to its widest spacing as the rotor apex seal sweeps through the hot high-pressure combustion chamber quadrant where the housing is the hottest and widest due to heat expansion. The high fuel consumption of Wankel engines is thus partly due to the expansion of nonsymmetrical components which causes the apex seals to leak excessively when traveling through the high-pressure, hot, expanded quadrant of the housing. Moreover, the manufacturing cost of Wankel engines is relatively high because of the necessity to attain the complex curvature of the internal housing. Although the Wankel engine is free of any appreciable vibration, it is difficult to achieve complete balance and some vibration is evident in operation. Wankel engines do, however, require adequate muffler means to silence the high-pressure exhaust blow-down noise.

Although these three types of prior art internal combustion engines are quite different in their physical make-up and operation, they all share the same single expansion feature. Each of these basic engine mechanisms possesses a single combustion chamber in which the products of combustion undergo limited expansion before the exhaust port is opened. Such single combustion/expansion chambers limit the amount of confined or controlled expansion available from the high-pressure combustion gases since these gases are released before they can be fully utilized for powering the engine. This is due to the fact that ignition of the fuel/air mixture increases the chamber pressure some 4 to 5 times what it was just prior to ignition, and the single combustion chamber cannot expand this high-pressure gas down to atmospheric pressure by the time it returns to its maximum volume. As a result, the remaining high-pressure gas must be expelled or it will accomplish negative work on the mechanism if retained too long. Thus exhaust gases up to about 100 psi or higher must be released and the work available in expanding these gases to atmospheric pressure is lost.

The rapid pressure release characteristic of these prior art internal combustion engines not only limits their thermal efficiencies but also gives rise to the previously noted high noise levels and to the uneven heating of engine parts which in turn causes undesirable thermal stresses.

The two- and four-stroke piston engines also have serious wear problems brought about by the necessity for the piston to make rubbing contact with the cylinder wall. The combustion forces cause the piston to push against the cylinder due to the angularity of the connecting rod during its power stroke, and the resulting wear is not symmetrical, causing the cylinder to wear egg-shaped after a limited service life. Finally, the clearance which must be maintained between the piston and cylinder for proper lubrication and warmup can cause a noisy metallic sounding piston slap especially noticeable in air-cooled, two-stroke engines.

It is therefore a primary object of this invention to provide an improved internal combustion engine. A further object is to provide an internal combustion engine of the character described which exhibits significant performance improvement in terms of higher power-to-fuel consumption ratios over presently used comparably sized internal combustion engines. Still another object is to provide a unique internal combustion engine in which exhaust blowdown is virtually eliminated and for which there is no need for a muffler; and for which the level of exhaust pollutants is low. An additional object is to provide an engine of the character described which is further characterized by its essential freedom from wear problems; which is therefore capable of longer operating life; which is lighter in weight than present internal combustion engines of equivalent horsepower; and which produces exhaust gases of relatively low temperature, thus making the engine particularly suitable for handheld tools such as chain saws and the like.

Yet a further object of this invention is to provide an internal combustion engine which operates on a unique cycle, incorporates a unique porting system and possesses the ability to operate at high speeds for extended periods of time.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In my United States Patent No. 3,630,178 I have disclosed a novel four-stroke internal combustion engine in which an orbiting piston, with its center connected to a crankshaft, revolves in a circular or orbital path. As the piston travels through its orbital path it slides back and forth inside a combustion chamber member causing it to reciprocate in a direction substantially perpendicular to the path of the orbiting piston. These combustion chambers are separated by the orbiting piston which causes them to alternately accomplish a compression and expansion stroke. The dual-stage, combustion/expansion engine of United States Patent No. 3,630,178 operates only on a four-stroke cycle and hence it is much more complex than the engine of this invention.

In my copending application Ser. No. 180,135, filed Aug. 21, 1980, now U.S. Pat. No. 4,325,331 incorporated herein by reference, I have disclosed a novel internal combustion engine operating on a novel dual-expansion cycle which attains a combination of the advantages associated with both two-stroke and four-stroke cycles while not being subject to their major disadvantages.

According to that invention there is provided a method of developing power mechanically through the combustion of a combustible fluid, comprising the steps of providing a source of a combustible fluid; providing a primary combustion/expansion chamber of controllable variable volume and a secondary expansion chamber of controllable variable volume in controllable fluid communication with the primary chamber; compressing within the primary chamber a predetermined amount of the combustible fluid by reducing the volume thereof to a minimum and igniting the combustible fluid as the volume approaches minimum, and simultaneously forcing combustion gases to exhaust from the secondary chamber by reducing the volume thereof while maintaining the primary and secondary chambers isolated from each other; increasing the volume of the primary chamber to provide combustion gases under pressure and simultaneously reducing the volume of the secondary chamber to its minimum while the chambers remain isolated from each other; preliminarily expanding the combustion gases in the primary chamber by increasing its volume; continuing expanding the combustion gases in the primary chamber and increasing its volume, and simultaneously transferring the combustion gases into the secondary chamber and increasing its volume whereby there is provided a total expansion volume greater than the maximum volume of the primary chamber to give rise to a fluid pressure within the chambers at or below ambient pressure; continuing transferring the combustion gases into the expending secondary chamber and simultaneously admitting the fuel/air mixture into the primary chamber thereby beginning the scavenging of the combustion gases from the primary chamber; decreasing the volume of the primary chamber while continuing the transferring and scavenging of the combustion gases and simultaneously increasing the volume of the secondary chamber; continuing decreasing the volume of the primary chamber thereby beginning the compressing of the fuel/air mixture while simultaneously decreasing the volume of the secondary chamber and exhausting the combustion gases therefrom at approximately ambient pressure while maintaining the primary and secondary chambers isolated from each other, thereby providing the conditions required to repeat the cycle; and employing the expansion of the combustion gases to deliver work.

The apparatus embodiments disclosed in U.S. Pat. No. 4,325,331 employ an orbiting piston within a reciprocating combustion chamber member to provide the required primary combustion/expansion and secondary expansion chambers. The apparatus embodiments of this invention which operate on the novel cycle described in U.S. Pat. No. 4,325,331, the disclosure of which is incorporated herein, utilize inner and outer oscillating pistons to define these chambers.

According to one aspect of this invention there is provided an internal combustion engine, comprising in combination housing means defining a fluid-tight volume; first outer piston means disposed within the volume, attached through pivot means to the housing means and defining a cavity therein; second inner piston means disposed within the cavity defined within the first piston means and attached to the first piston through pivot connecting means for oscillation within the cavity; power transfer shaft means rotatably supported in the housing means; and eccentric shaft means coupled to the power transfer shaft means for orbiting with respect thereto and to the second piston means to coordinate pivotal movement of the first and second piston means.

According to another aspect of this invention there is provided an internal combustion engine, comprising in combination engine block housing means defining a fluid-tight engine volume; first outer oscillating piston means formed as a base section with two oppositely disposed arms joined at their ends through a moving fluid passage and defining a cavity between the arms; pivot bearing means mounted in the engine block housing means providing pivotal attachment of the first piston means to the housing means to permit the first piston means to undergo oscillatory motion thereby to define within the engine volume two opposed outer fluid chambers of complementary variable volumes; second inner oscillating piston means within the cavity of the first piston means; pivot connecting means providing pivotal attachment of the second piston means to the first piston means to permit the second piston means to undergo oscillatory motion thereby to define within the cavity two opposed inner fluid chambers of complementary variable volumes; ignition means associated with a first of the chambers serving as a primary combustion/expansion chamber; first fluid porting means providing controlled fluid communication between the first of the chambers and a second of the chambers serving as a secondary expansion chamber; exhaust port means associated with a third of the chambers; second fluid porting means providing controlled fluid communication between the second and third of the chambers; combustible fluid supply means associated with a fourth of the chambers; third fluid porting means providing controlled fluid communication between the fourth and first of the chambers; power transfer shaft means rotatably supported in the housing means; and eccentric shaft means coupled to the power transfer shaft means for orbiting with respect thereto and to the second piston means to coordinate movement of the first and second piston means.

For a fuller understanding of the nature and objects of the invention, reference should be had to the following detailed description taken in connection with the accompanying drawings in which.

Figure 1:
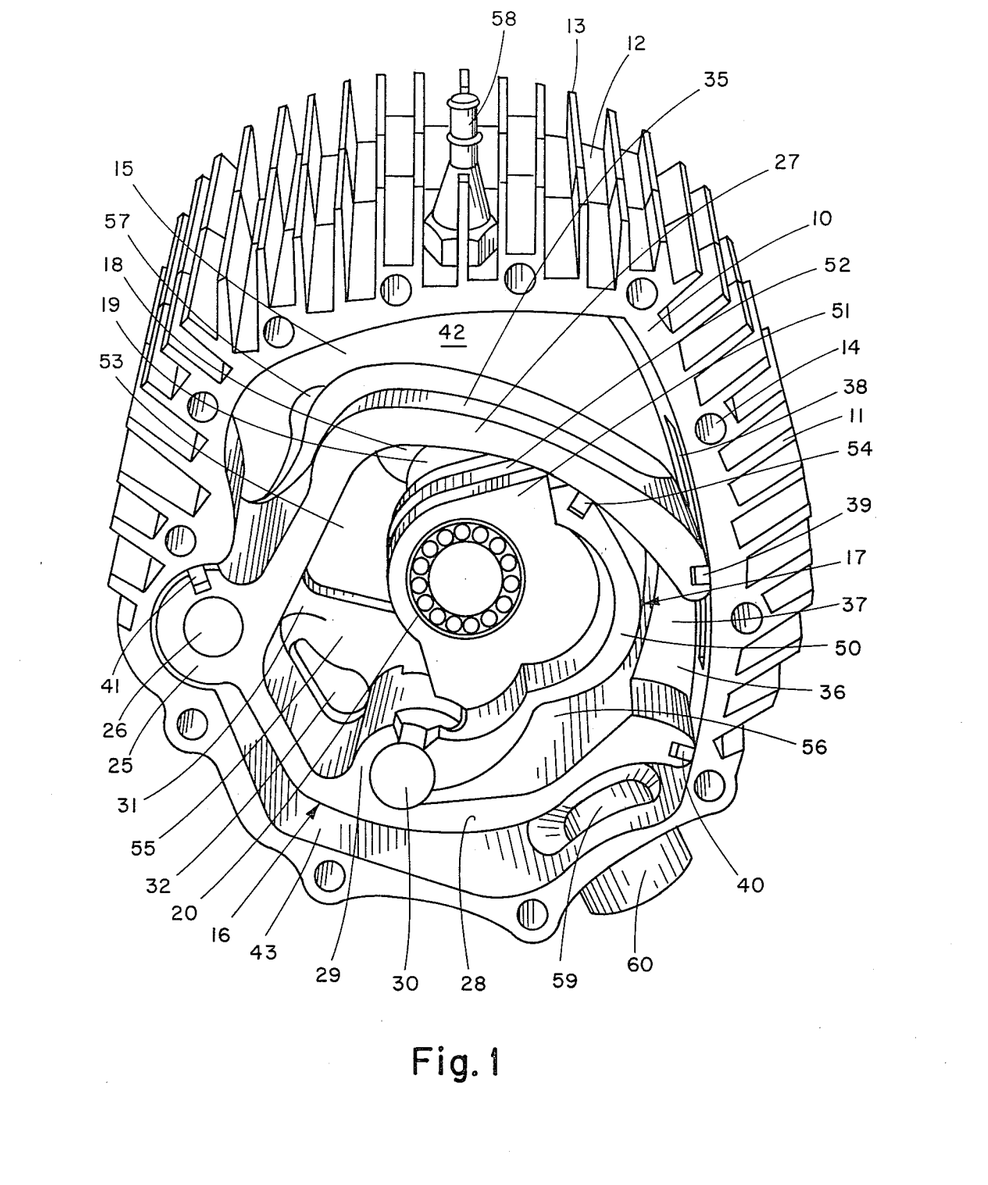
FIG. 1 illustrates, in a perspective view, the basic structure of the engine of this invention with one side plate removed.

Turning to FIG. 1, it will be seen that in its basic structure the internal combustion engine of this invention comprises a central power block housing 10, having a plurality of cooling surfaces such as fins 11, bolted between two parallel and opposed end plates 12 (one being removed) completing the housing means. These end plates also have a plurality of cooling fins 13. The engine is assembled using suitable bolts extending through peripherally located holes 14. There is defined with power block 10 and end plates 12 a fluid-tight volume 15 in which an outer oscillating member 16 and inner oscillating member 17 move. Inasmuch as members 16 and 17 are responsive to fluid pressures, define chambers of variable volumes in their motions and generate power, they are, for convenience, referred to as "oscillating pistons." Power is delivered to the main engine shaft comprising a back shaft segment 18 and a front shaft segment (not shown) which are supported and aligned by suitable shaft bearings (not shown) mounted in the two end plates 12. Main engine shaft segments are joined through eccentric shaft 19 to which inner oscillating piston 17 is affixed through bearing 20. It will be appreciated that the movement of inner piston 17 effects rotation of the main engine shaft as is detailed below in FIG. 7.

Outer oscillating piston 16 will be seen to comprise a base section 25 mounted on a pivot bearing 26, supported in end plates 12, and two arms 27 and 28, arm 28 having a bearing segment 29 arranged to partially encompass a pivot bearing connection 30. Affixed to or integral with one side of arm 28 is arm aperture plate 31 having a fluid port 32 cut therethrough. In the engine embodiment of FIGS. 2-5, a comparably configured port 30 is cut through back end plate 12 to provide controlled fluid communication between a fuel pumping chamber and a source of a combustible fluid, e.g., a carburetor supplying a fuel/air mixture. In the embodiment of FIG. 1, outer oscillating piston 16 may be termed the "power piston" having a crown 35 along the top of arm 27.

Figure 2:
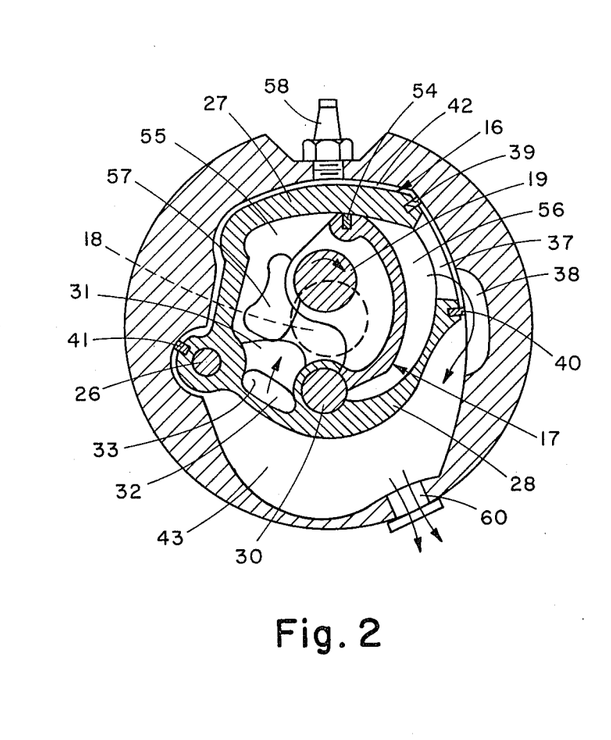
FIG. 2-5 are transverse cross sectional views of an embodiment of the engine in which the primary combustion/expansion chamber is defined external of the outer oscillating piston and they illustrate the operational sequence of the cycle on which the embodiment operates.

Arms 27 and 28 of outer piston 16 are joined by a port defining connection member 36 which is of a suitable height to define a moving fluid passage 37 in communication with side fluid port 38 cut in central block 10. It will be seen from the sequential FIGS. 2-5 and FIGS. 8-11 that the role of moving fluid passage 37 is to provide controlled fluid communication by way of side port 38 between different chambers as the two pistons undergo their oscillatory motions. This requires that passage 37 and side port 38 be sized and located to alternatively provide for fluid to flow from the primary combustion/expansion chamber to the secondary expansion chamber and then from the secondary expansion chamber to the condensing/exhausting chamber. Sliding seals 39 and 40 are provided to prevent any shortcircuiting of fluid flow during the cycle; and seal 41 effects the necessary fluid sealing between chambers 42 and 43 defined between the walls of outer oscillating piston 16 and the internal walls of volume 15 which are configured to correspond to the external configuration of outer piston 16 in its opposed extreme positions as illustrated in FIGS. 2 and 4.

Inner oscillating piston 17 comprises a main or crown wall 50 and spaced parallel central shaft plates 51 and 52, the spacing between shaft plate 52 and back plate 12 being such as to permit aperture plate 31 of outer piston 16 to slip in and out of this space to allow inner piston 17 to swing back and forth inside the cavity 53 defined within outer piston 16. A sliding seal 54 provides for isolating chambers 55 and 56 which are defined in cavity 53 by the motion of inner oscillating piston 17 within outer oscillating piston 16.

The combustible mixture, e.g., a fuel/air mixture, is pumped from chamber 55 into chamber 42 through fuel port 57 which is cut into back engine plate 12; and a suitable ignition means, e.g., a spark plug 58, or glow plug, is mounted in the central power block to ignite the fuel in chamber 42. An exhaust port 59, having an external exhaust pipe 60, is provided in central power block 10 to be in fluid communication with chamber 56.

In operation, outer oscillating piston 16 swings up and down from pivot bearing 26, and as it moves it carries inner oscillating piston 17 with it. Inner piston 17 swings back and forth inside cavity 53 in piston 16 by virtue of its single pivot bearing connection 30 to piston 16. Inner piston 17 is also attached through bearing 20 to eccentric shaft 19, and as main engine shaft 18 is rotated it causes eccentric shaft 19, and hence inner oscillating piston 17, to follow in an oscillating path. The vertical displacement portion of this movement causes the vertical movement of inner piston 17 to be transferred through pivot bearing 30 into outer piston 16 to cause the outer piston to swing up and down from pivot bearing 26. This motion causes chambers 42 and 43 to vary in volume.

The horizontal displacement portion of the orbiting path of eccentric shaft 19 causes inner piston 17 to swing back and forth from pivot bearing 30 and chambers 55 and 56 to change volumes. This action of the inner and outer oscillating pistons thus provides four independent, sealed chambers of continuously changing volumes. At any instant of time rotation of the eccentric shaft causes two of the chambers, e.g., chambers 42 and 55, to increase in volume while the other two chambers, e.g., chambers 43 and 56, decrease in volume. This mechanism is so designed that the pivotal movement of the two pistons is coordinated to give the two pistons the same period of oscillation. Since there is only rotary motion between all moving part interconnections, no sliding contact between the members is required. This feature therefore confines all load friction in the engine to that of the pivot bearings; it eliminates high-friction sliding contacts; and it reduces running friction, all of which contribute to increasing the operating life of the engine.

It is possible by using different embodiments of the basic structure shown in FIG. 1, to operate the engine of this invention in several different modes.

In the embodiment of FIGS. 2-5, chamber 42 serves as the primary combustion/expansion chamber; chamber 56 as the secondary expansion chamber; chamber 55 as a fuel/air mixture pressure/pumping chamber; and chamber 43 as a condensing/exhausting chamber to condense lubricant out of the combustion gases before they are discharged through exhaust pipe 60. As will be seen, engine shaft 18 turns in a clockwise direction in this mode of operation.

In the operation of the engine of FIGS. 2-5, the fuel/air mixture is forced under pressure from chamber 55 into primary combustion expansion chamber 42, and at the same time this is occurring, the combined expansion of chambers 42 and 56 is causing a suction of the exhaust products out of the chamber 42 into chamber 56 through side port 38 and moving fluid passage 37. This pressure/suction action gives the fuel/air mixture an increased capability to fill the combustion chamber due to the push-pull action of chambers 55 and 56 on the combustion chamber 42. For this action to take place, the combined maximum volume of chambers 42 and 56 should be about three times the volume of primary combustion/expansion chamber 42 at the point compression of the fuel/air mixture is begun.

In FIG. 2, eccentric shaft 19 is shown at its top dead center, which means that inner piston 17 is at its highest position. Because of the direct pivotal connection between pistons 16 and 17 at pivot bearing 30, outer piston 16 is likewise at its top dead center position which means that primary combustion/expansion chamber 42 is at minimum volume. Ignition of the fuel/air mixture previously introduced into chamber 42 will have been initiated about 20° before the attainment by outer piston 16 of this top dead center position and is continued until it moves about 20° beyond this position. Expansion of the combustion gases in chamber 42 imparts a driving force to main engine shaft 18 as outer piston 16 moves downwardly. Simultaneously with the downward movement of outer power piston 16, inner piston 17 moves relative to pivot bearing connection 30 to decrease the volume of secondary expansion chamber 56 and increase the volume of pressure/pumping chamber 55. It will be seen that port 32 in aperture plate 31 is in position to uncover port 33 to permit the combustible fuel/air mixture to enter chamber 55. As chamber 56 decreases in volume the combustion gases, previously transferred there, are forced from chamber 56 through moving fluid passage 37 and side port 38 into condensing/exhausting chamber 43 and out through exhaust pipe 60. Chambers 42 and 56 remain sealed from each other by strip seal 39 and the close bearing fit of pivot bearing 30.

Figure 3:
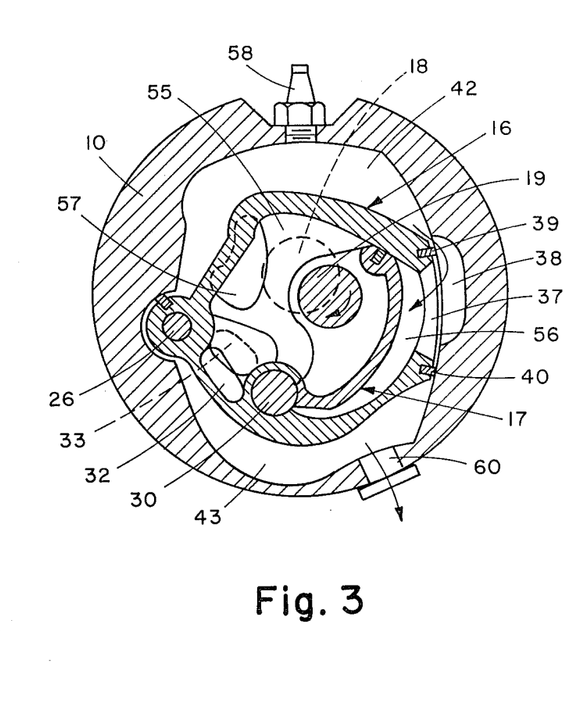
Figure 4:
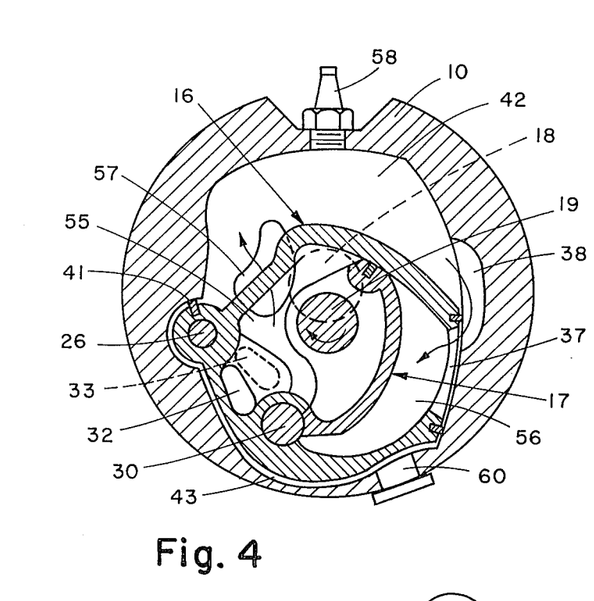

FIG. 3 represents the point in the cycle where the eccentric shaft 19 has progressed about 120° beyond top dead center and where high-pressure gas from chamber 42 begins to be transferred through side port 38 and moving passage 37 into secondary expansion chamber 56, now sealed off from condensing chamber 43 by strip seal 40. It will be appreciated that at this point in the cycle inner piston 17 will have reached its rightmost position and will have begun to move back toward the left. The controlled establishing of the fluid communication between primary combustion/expansion chamber 42 and secondary expansion chamber 56 provides the unique dual-expansion feature of the engine of this invention. Generally, moving fluid passage 37 and side port 38 are so sized and located that communication between primary combustion chamber 42 and secondary expansion chamber 56 is established as the volume of chamber 42 approaches about one-half its maximum.

The continued expansion of the combustion gases in chamber 56 causes inner piston 17 to continue to provide rotary motion to main engine shaft 18 and it also effects the compression of the fuel/air mixture introduced into chamber 55 as this chamber experiences a decrease in volume.

In FIG. 4, eccentric shaft 19, along with outer power piston 16, has reached bottom dead center, condensing/exhausting chamber 43 has reached minimum volume with the completion of the exhausting of gases therefrom; and fluid communication between pressure/pumping chamber 55 and combustion chamber 42, by way of port 57, has been realized. Thus the fuel/air mixture is being pumped into chamber 42 by virtue of the decrease in volume experienced by chamber 55. At this point, the combined total expansion in chambers 42 and 56 has reduced the fluid pressure in these chambers to essentially atmospheric pressure; and because of the decreased pressure in chamber 42, the fuel/air mixture is readily pumped into it through port 57. The resulting combination of forcing the fuel/air mixture into combustion chamber 42 from pressurized chamber 55 and of creating a suction effect in chamber 42 by the further expansion of gases in chamber 56 results in a push-pull effect which ensures complete filling of chamber 42 with the fuel/air mixture. During the pumping of the combustible fluid into chamber 42, the configuration of aperture plate 31 and location of port 32 prevents any communication between the carburetor and chamber 55 and hence any blowing back of the fuel/air mixture into the carburetor while chamber 55 is pressurized.

Figure 5:
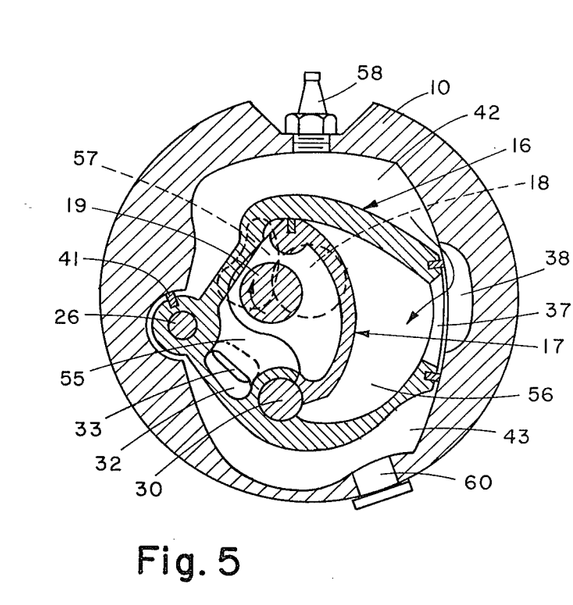

Finally, in FIG. 5, eccentric shaft 19 is shown to be about 80° beyond bottom dead center. Outer power piston 16 has moved upwardly to close port 57 and shut off the flow of the fuel/air mixture into chamber 42. This allows port 33 to start to open to begin the introduction of the fuel/air mixture into pressure/pumping chamber 55 as this chamber reaches minimum volume. Secondary expansion chamber 56 has attained maximum volume and is in condition to be sealed off from primary combustion/expansion chamber 42 and opened up to condensing/exhausting chamber 43. As outer power piston 16 moves upwardly to its top dead center position of FIG. 2, the fuel/air mixture in chamber 42 is compressed and ignited to begin the cycle anew.

Figure 6:
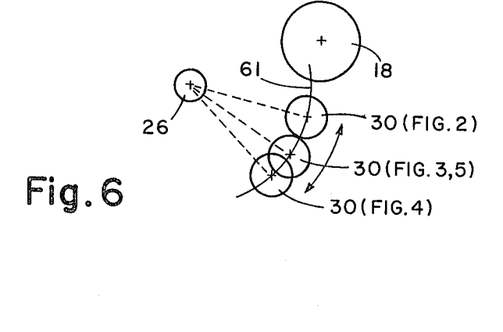
FIG. 6 diagrams the oscillatory motion along a circular arc of the pivot pin connecting the two oscillating pistons.
Figure 7:
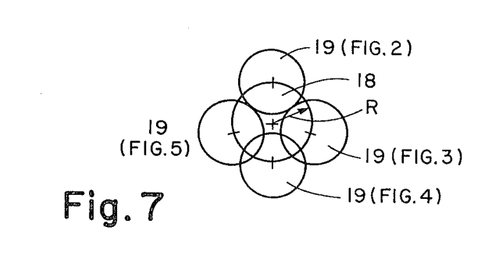
FIG. 7 diagrams the rotating motion of the eccentric shaft to which the inner oscillating piston is connected.

FIGS. 6 and 7 diagram the motion of pivot bearing connection 30 between the outer and inner pistons and the oscillating motion of the inner piston relative to main engine power shaft 18. As will be seen in these figures, the axes of pivot bearing 26, pivot bearing connection 30, main power shaft 18 and eccentric shaft 19 are so mounted and supported as to be parallel to each other. As shown in FIG. 6, the axis of pivot bearing connection 30 oscillates in a path which is defined by the arc 61 of a circle, the center of which coincides with the axis of pivot bearing 26. This oscillatory motion of FIG. 6 occurs in all of the embodiments of the engine of this invention. FIG. 7 illustrates the rotary motion of eccentric shaft 19 about main power shaft 18, the radius R being the distance between the axes of shafts 18 and 19. This rotary motion is also common to all of the embodiments of the engine.

Finally, it will be seen from an examination of FIGS. 2-5, that during the operational cycle of the engine of this invention the direction of travel of outer piston 16 at its middisplacement point is approximately perpendicular to the direction of travel of inner piston 17 at its middisplacement point.

In the embodiment of FIGS. 8-11, the oscillating pistons 16 and 17 have been inverted so that arm 28 of outer power piston 16 defines one boundary of the primary combustion/expansion chamber 62 and arm 27 defines a boundary of condensing chamber 63. It will be seen that the configurations of the internal walls of volume 15 of central power block 10 have been altered to conform to the reversal of piston arm positioning. This inversion of the piston arms places pivot bearing 30 directly under the crown of power piston 16 in contrast to the arrangement of FIGS. 2-5. Inner oscillating piston 17 defines with the wall of volume 15 a secondary expansion chamber 64 and with the inner walls of piston 16 a pumping chamber 65. In order to provide a flow path for the fuel/air mixture in this embodiment, main engine shaft 18 and pivot bearing 26 are constructed to have rotary valves (not shown) incorporated therein; ports 32 and 33 of FIGS. 2-5 are omitted; and bypass port 66 replaces port 57. The fuel/air mixture is provided to the rotary valve in shaft 18.

The embodiment of FIGS. 8-11 offers the advantages of being able to increase the usable expansion volume of the engine by about 20% over that of the embodiment of FIGS. 2-5, with a concomitant small increase in efficiency, and of being able to load pivot bearing 30 in an upwardly direction in which more bearing area is available to reduce engine wear.

Figure 8:
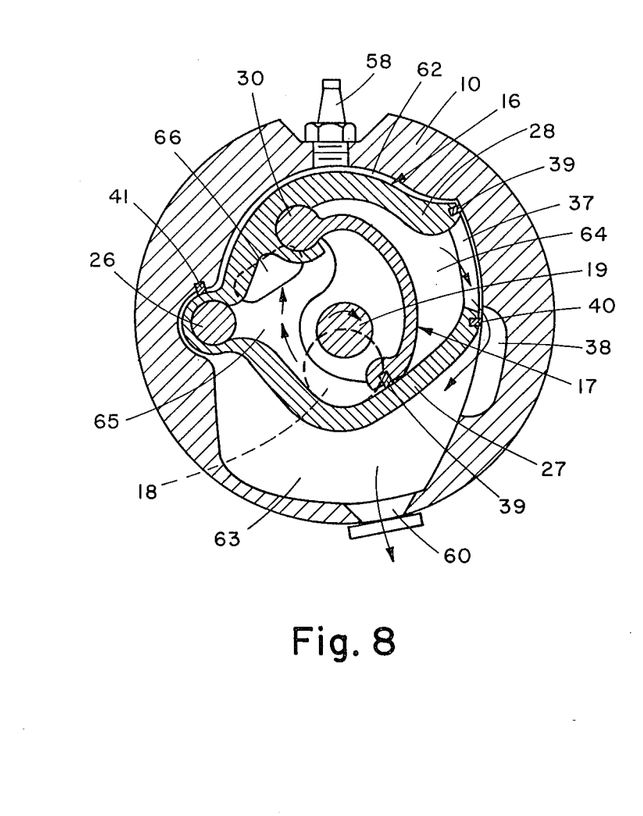
FIGS. 8-11 are transverse cross sectional views of a modification of the embodiment of FIGS. 2-5 illustrating the operational sequence of the cycle on which the modification operates.
Figure 9:
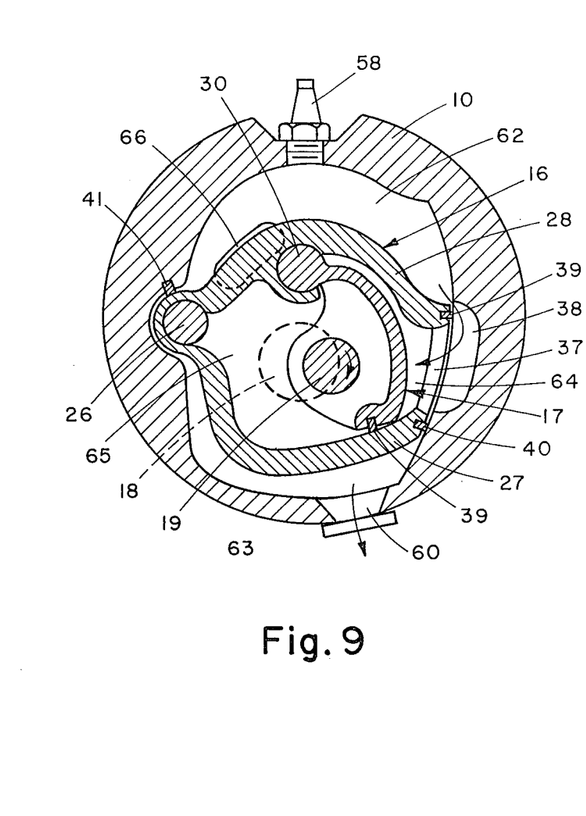
Figure 10:
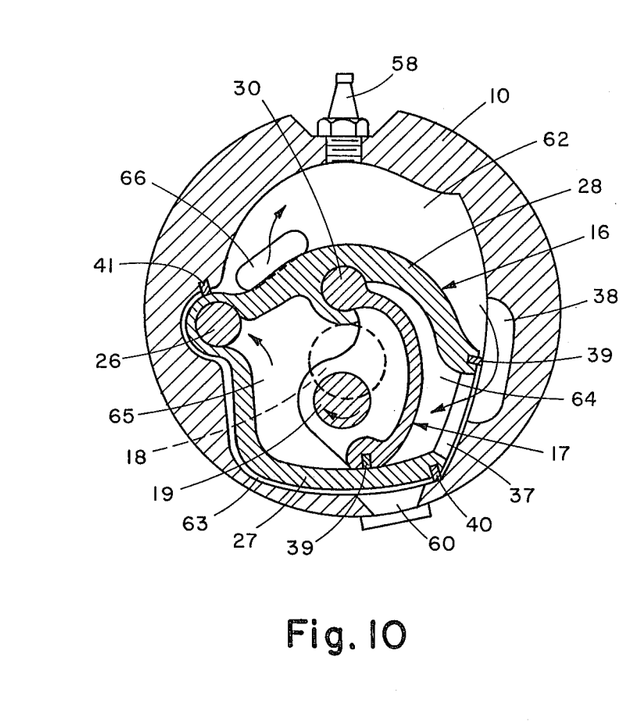
Figure 11:
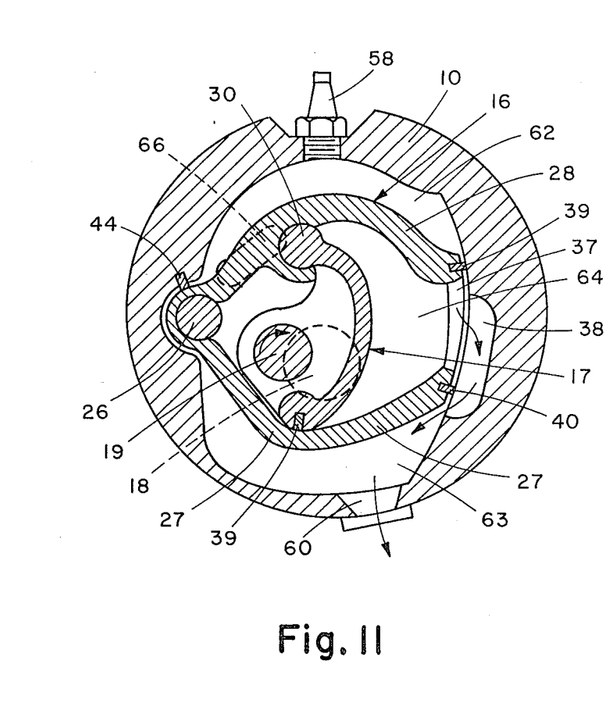

FIG. 8 shows outer oscillating power piston in its top dead center position which means that ignition has begun and power is being delivered to main engine shaft 18 through eccentric shaft 19. The situation with regard to the relationship of primary combustion/chamber 62 to secondary expansion chamber 64 is essentially the same throughout FIGS. 8-11 as described for FIGS. 2-5; and therefore the dual-expansion feature is the same in both embodiments. However, the role of pressure/pumping chamber 65 is somewhat different as is the means by which the fuel/air mixture is controllably inducted into combustion chamber 62. Chamber 65 is filled with the fuel-air mixture as inner piston 17 moves to increase its volume. Then as inner piston 17 reverses its motion to effect a decrease in the volume of chamber 65, the fuel/air mixture begins to be compressed. With the attainment of partial (e.g., about one-half) secondary expansion in chamber 64 (FIG. 10), the rotary valve in pivot bearing 26 opens to allow the partially compressed fuel/air mixture to be pumped from pressure/pumping chamber 65, which is decreasing in volume into primary combustion/expansion chamber 62 via bypass port 66. As the fuel/air mixture enters combustion chamber 62 by this process of "pressurized" induction, the products of combustion are being pulled through port 16 into chamber 64 through suction action brought about through the rapid expansion in chamber 64. This push-pull method of fuel/air induction brings about an efficient and essentially complete charging of chamber 62 with the fuel/air mixture. By the time eccentric shaft 19 reches 90°0 before top dead center (FIG. 11), the charging of chamber 62 is complete, compression is underway and the cycle is ready to begin anew.

In the embodiment of FIGS. 12-15, the roles of the outer and inner oscillating pistons are reversed, for inner piston 17 serves as the power piston. Thus chambers 70 and 71 defined by the motion of inner piston 17 within the cavity of outer piston 16 serve as the primary combustion/expansion and condensing/exhausting chambers, respectively; while chambers 72 and 73 defined by the motion of outer piston 16 within volume 15 of central engine block 10 serve as the secondary expansion and pressure/pumping chambers, respectively. Arm 27 of piston 16 is modified to have an enlarged sealing section 74 and a piston controlled port 75 to regulate the flow of fluid from chamber 70 into chamber 72 and from chamber 72 into chamber 71 for discharge through exhaust port 76. An additional seal 77 is provided between the two pistons to keep high-pressure fluid from shortcircuiting from primary combustion/expansion chamber 70 directly into condensing exhausting chamber 71 without pressurizing chamber 72. A filler piece 78, integral with the internal wall defining volume 15 is arranged to essentially fill the void of port 75 when chamber 72 has reached minimum volume. Fuel/air inlet port 79, which communicates with a carburetor, opens into a bypass port 80 cut into the back end plate. The moving fluid port 81 between the ends of arms 27 and 28 of outer piston 16 provides controlled exposure of the ignition means, e.g., spark plug 58, to the fuel/air mixture in primary combustion/expansion chamber 70.

Figure 12:
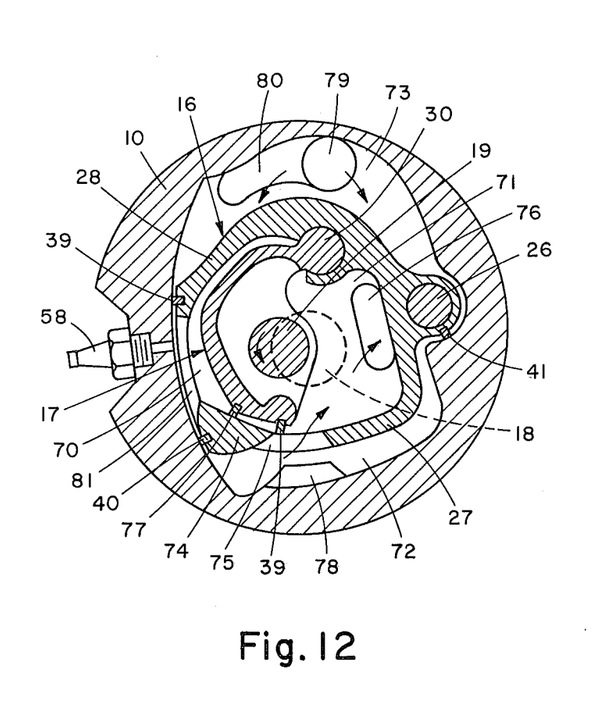
FIGS. 12-15 are transverse cross sectional views of another embodiment of the engine in which the primary combustion/expansion chamber is defined internal of the outer oscillating piston and they illustrate the operational sequence of the cycle on which the embodiment operates.

In FIG. 12 inner power piston 17 is shown in its top dead center position relative to primary combustion/expansion chamber 70. Inasmuch as the ignition of the fuel/air mixture has been initiated the combustion gases in chamber 70 are beginning to apply power to inner piston 17 to rotate eccentric shaft 19, and hence power shaft 18, in a counterclockwise direction. The movement of inner power piston 17 causes outer piston 16 to travel downwardly, a movement which causes pressure/pumping chamber 73 to increase in volume. A timed rotary valve (not shown) associated with fuel/air induction port 79 permits the fuel/air mixture to enter chamber 73. Simultaneously, the combustion gases from the second stage expansion in secondary expansion chamber 72 are being extracted into chamber 71 by way of piston-controlled fluid port 75 to be exhausted through exhaust port 76.

Figure 13:
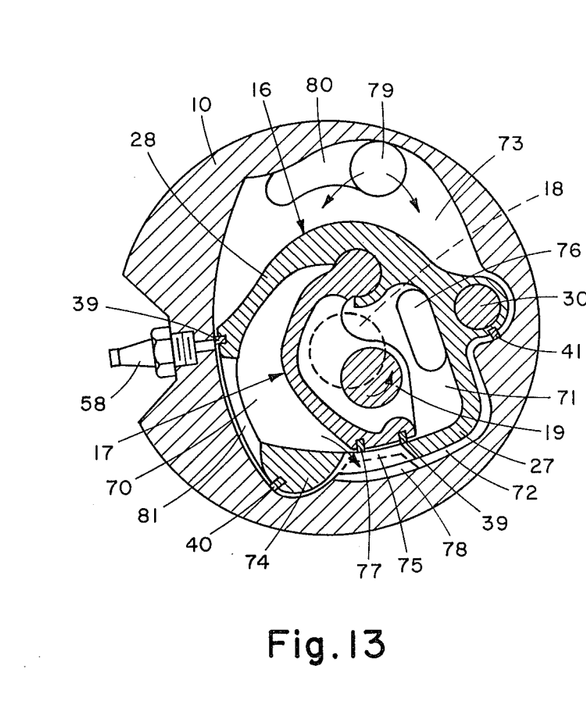

FIG. 13 illustrates the position of the engine components 120° after inner power piston 17 reaches its top dead center position. At this point in the cycle the high-pressure combustion products are beginning to be transferred, through piston-controlled port 75 into secondary expansion chamber 72 for further expansion. At the beginning of such transference, chamber 72 is at minimum volume which is less than in the embodiments of FIGS. 2-9 because fluid port 75 may be essentially closed off by filler piece 78 and because no side port comparable to port 38 is involved. Fuel/air pressure/pumping chamber 73 has reached maximum volume and the rotary valve associated with induction port 79 closes off the flow of the combustible fluid when eccentric shaft 19 reaches an angle of about 150° beyond top dead center. Chamber 71, now closed off from chamber 72, decreases in volume and pumps out the remaining combustion products.

Figure 14:
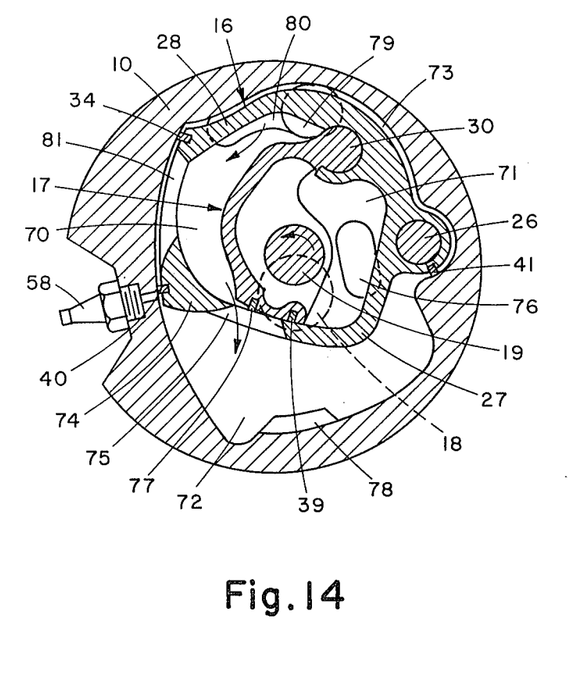

The eccentric shaft 19 has reached 90° before top dead center in FIG. 14 and pressure/pumping chamber 73 has reached minimum volume causing it to pump the fuel/air mixture under pressure into primary combustion/expansion chamber 70 by way of bypass port 80. Compression of the fuel/air mixture continues in chamber 70 in preparation for ignition which can take place about 20° before top dead center. It will also be seen from FIG. 14 that the flow of fluid from chamber 70 into secondary expansion chamber 72 is about to be cut off since chamber 72 has reached maximum volume allowing the expansion of the combustion gases down to essentially atmospheric pressure.

Figure 15:
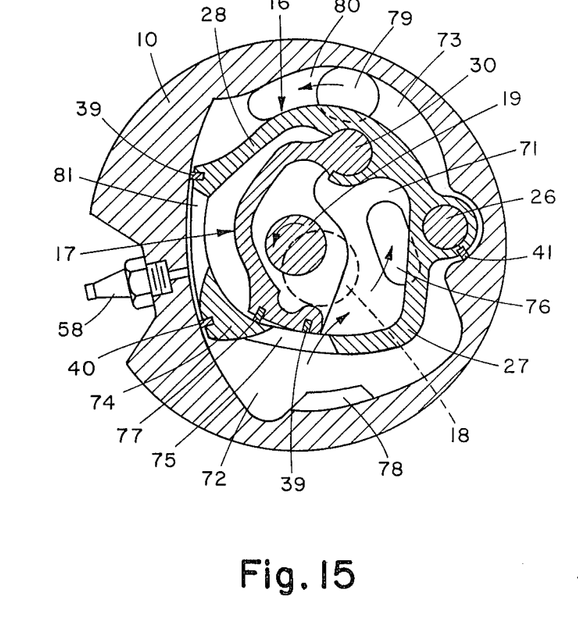

Finally, FIG. 15 depicts the position of the pistons at the time when inner power piston 17 has completed about one half of its compression stroke. With the closing off of bypass port 80 from chamber 73 into chamber 71, the rotary valve associated with induction port 79 opens to begin to induct a further fuel/air mixture supply. The increase in the volume of chamber 73 is, of course, accompanied by a decrease in the volume of chamber 72, thus effecting the transference of gases from chamber 72 to chamber 71 through the now open port 75. Further movement of FIG. 15 to FIG. 12 completes the cycle and enables it to begin again.

From the above detailed description of the internal combustion engine of this invention it will be apparent that there is provided a novel engine which exhibits a thermal efficiency higher than the present two- and four-stroke engines and the Wankel engine due primarily to the dual-expansion feature which reduces exhaust pressure to near atmosphere. The engine of this invention is, moreover, relatively quiet and cool to operate and presents minimal wear problems.

It will thus be seen that the objects set forth above, among those made apparent from the preceding description, are efficiently attained and, since certain changes may be made in the above constructions without departing from the scope of the invention, it is intended that all matter contained in the above description shall be interpreted as illustrative and not in a limiting sense.

I claim:

1. An internal combustion engine, comprising in combination
   (a) housing means defining a fluid-tight volume;
   (b) first outer piston means disposed within said volume, attached through pivot means to said housing means and defining a cavity therein;
   (c) second inner piston means disposed within said cavity defined within said first piston means and attached to said first piston through pivot connecting means for oscillation within said cavity;
   (d) power transfer shaft means rotatably supported in said housing means; and
   (e) eccentric shaft means coupled to said power transfer shaft means for rotating with respect thereto and to said second piston means to coordinate pivotal movement of said first and second piston means.

2. An internal combustion engine in accordance with claim 1 wherein said first outer piston means oscillates relative to said housing at the same frequency as said second inner piston means oscillates relative to said first piston means.

3. An internal combustion engine in accordance with claim 2 wherein the axis of said pivot means and the axis of said pivot connecting means are parallel and said axis of said pivot connecting means undergoes oscillatory motion along the arc of a circle having its center coincident with said axis of said pivot means.

4. An internal combustion engine in accordance with claim 3 wherein the middisplacement direction of travel of said first outer piston means is approximately perpendicular to the middisplacement direction of travel of said second inner piston means.

5. An internal combustion engine in accordance with claim 4 wherein said first outer piston means in its oscillating motion defines opposed first and third chambers of variable and complementary volumes and said second inner piston means in its oscillating motion defines opposed second and fourth chambers of variable and complementary volumes.

6. An internal combustion engine in accordance with claim 5 wherein said first chamber is a primary combustion/expansion chamber, said second chamber is a secondary expansion chamber, and third chamber is a condensing/exhausting chamber and said fourth chamber is a combustible fluid pumping/pressure chamber; and including first controlled fluid porting means arranged to alternately provide fluid communication between said first and second chambers and between said second and third chambers, and second controllable fluid porting means between said fourth and first chambers; means to controllably introduce said combustible fluid into said fourth chamber; and ignition means arranged to ignite said combustible fluid in said first chamber.

7. An internal combustion engine in accordance with claim 6 wherein said first controlled fluid porting means comprises a stationary fluid bypass port in said housing means and a moving fluid passage in said first outer piston means whereby said oscillating motion of said first outer piston means alternately provides said fluid communication between said first and second chambers and said second and third chambers.

8. An internal combustion engine in accordance with claim 6 wherein said second controllable fluid porting means comprises bypass port means located and configured to be opened and closed by said oscillating motion of said second inner piston means.

9. An internal combustion engine in accordance with claim 6 wherein the combined maximum volume of said first and second chambers is about three times the volume of said first chamber at the time pressurization of said combustible fuel is begun in said first chamber.

10. An internal combustion engine in accordance with claim 4 wherein said second inner piston means in its oscillating motion defines first and third chambers of variable and complementary volumes and said first outer piston means in its oscillating motion defines opposed second and fourth chambers of variable and complementary volumes.

11. An internal combustion engine in accordance with claim 10 wherein said first chamber is a primary combustion/expansion chamber, said second chamber is a secondary expansion chamber, said third chamber is a condensing/exhaust chamber and said fourth chamber is a combustible fluid pumping pressure chamber; and including controlled fluid porting means arranged to alternately provide fluid communication between said first and second chambers and between said second and third chambers, and second controllable fluid porting means, between said fourth and first chambers; means to controllably introduce said combustible fluid into said fourth chamber; and ignition means arranged to ignite said combustible fluid in said first chamber.

12. An internal combustion engine in accordance with claim 11 wherein said first controlled fluid porting means comprises a moving fluid port in the wall of said first outer piston means, the flow of fluid through which is controlled by the wall of said second inner piston means in its oscillating motion.

13. An internal combustion engine in accordance with claim 12 including port filler means integral with the internal wall defining said fluid-tight volume and arranged to essentially fill the void space of said moving fluid port when said second chamber reaches minimum volume.

14. An internal combustion engine in accordance with claim 11 wherein said second controllable fluid porting means comprises bypass port means located and configured to be opened and closed by said oscillating motion of said first outer piston means.

15. An internal combustion engine in accordance with claim 10 wherein the combined maximum volume of said first and second chambers is about three times the volume of said first chamber at the time pressurization of said combustible fuel is begun in said first chamber.

16. An internal combustion engine comprising in combination
   (a) engine block housing means defining a fluid-tight engine volume;
   (b) first outer oscillating piston means formed as a base section with two oppositely disposed arms joined at their ends through a moving fluid passage and defining a cavity between said arms;
   (c) pivot bearing means mounted in said engine block housing means providing pivotal attachment of said first piston means to said housing means to permit said first piston means to undergo oscillatory motion thereby to define within said engine volume two opposed outer fluid chambers of complementary variable volumes;
   (d) second inner oscillating piston means within said cavity of said first piston means;
   (e) pivot connecting means providing pivotal attachment of said second piston means to said first piston means to permit said second piston means to undergo oscillatory motion thereby to define within said cavity two opposed inner fluid chambers of complementary variable volumes;
   (f) ignition means associated with a first of said chambers serving as a primary combustion/expansion chamber;
   (g) first fluid porting means providing controlled fluid communication between said first of said chambers and a second of said chambers serving as a secondary expansion chamber;
   (h) exhaust port means associated with a third of said chambers;
   (i) second fluid porting means providing controlled fluid communication between said second and third chambers;
   (j) combustible fluid supply means associated with a fourth of said chambers;
   (k) third fluid porting means providing controlled fluid communication between said fourth and first chambers;
   (l) power transfer shaft means rotatably supported in said housing means; and
   (m) eccentric shaft means coupled to said power transfer shaft means for rotating with respect thereto and to said second piston means to coordinate movement of said first and second piston means.

17. An internal combustion engine in accordance with claim 16 wherein the axis of said pivot bearing means and the axis of said pivot connecting means are parallel and said axis of said pivot connecting means undergoes oscillatory motion along the arc of a circle having its center coincident with said axis of said pivot bearing means.

18. An internal combustion engine in accordance with claim 17 wherein the middisplacement direction of travel of said first outer oscillating piston means is approximately perpendicular to the middisplacement direction of travel of said second inner oscillating piston means.

19. An internal combustion engine in accordance with claim 17 wherein said two outer fluid chambers are said first and third of said chambers, said two inner fluid chambers are said second and fourth of said chambers, said first and second fluid porting means comprise said moving fluid passage means of said first piston means and a side port cut in said housing means; and said third fluid porting means comprises bypass port means located and configured to be opened and closed by said oscillating motion of said second inner piston means.

20. An internal combustion engine in accordance with claim 16 wherein the combined maximum volume of said first and second of said chambers is about three times the volume of said first of said chambers at the time pressurization of said combustible fuel is begun in said first of said chambers.

21. An internal combustion engine in accordance with claim 17 wherein said two inner fluid chambers are said first and third of said chambers, said two outer fluid chambers are said second and fourth of said chambers, said first and second fluid porting means comprise a moving fluid port in the wall of said first outer piston means, the flow of fluid through which is controlled by the wall of said second inner piston means in its oscillating motion; and said third fluid porting means comprises bypass port means located and configured to be opened and closed by said oscillating motion of said first outer piston means.

22. An internal combustion engine in accordance with claim 21 wherein the combined maximum volume of said first and second of said chambers is about three times the volume of said first of said chambers at the time pressurization of said combustible fuel is begun in said first of said chambers.

* * * * *